(12) United States Patent
Li (10) Patent No.: US 9,784,300 B2
(45) Date of Patent: Oct. 10, 2017

(54) THREAD-LOCKING ASSEMBLY

(71) Applicants: HANGZHOU GREAT STAR TOOLS CO., LTD., Hangzhou (CN); HANGZHOU GREAT STAR INDUSTRIAL CO., LTD., Hangzhou (CN)

(72) Inventor: Yueming Li, Hangzhou (CN)

(73) Assignee: HANGZHOU GREAT STAR TOOLS CO., LTD, Hangzhou (CN)

( * ) Notice: Subject to any disclaimer, the term of this patent is extended or adjusted under 35 U.S.C. 154(b) by 0 days.

(21) Appl. No.: 14/369,847

(22) PCT Filed: Mar. 11, 2014

(86) PCT No.: PCT/CN2014/073231
§ 371 (c)(1),
(2) Date: Dec. 3, 2015

(87) PCT Pub. No.: WO2015/135140
PCT Pub. Date: Sep. 17, 2015

(65) Prior Publication Data
US 2016/0108952 A1  Apr. 21, 2016

(51) Int. Cl.
*F16B 39/28* (2006.01)
*F16B 2/06* (2006.01)
*F16B 39/24* (2006.01)

(52) U.S. Cl.
CPC .............. *F16B 39/28* (2013.01); *F16B 2/065* (2013.01); *F16B 39/24* (2013.01)

(58) Field of Classification Search
CPC ...... F16B 2/065; F16B 39/28; F16B 39/2825; Y10S 411/936
(Continued)

(56) References Cited

U.S. PATENT DOCUMENTS

| 23,409 A | * | 3/1859 | Thom | ..................... F16B 25/00 |
| | | | | 411/411 |
| 875,168 A | * | 12/1907 | Gaston | .................... F16B 39/24 |
| | | | | 351/141 |

(Continued)

FOREIGN PATENT DOCUMENTS

| CN | 2190185 Y | 2/1995 |
| CN | 2889619 Y | 4/2007 |

(Continued)

*Primary Examiner* — Flemming Saether
(74) *Attorney, Agent, or Firm* — Allen, Dyer, Doppelt & Gilchrist P.A.

(57) ABSTRACT

The present invention discloses a thread-locking assembly characterized by comprising an externally threaded member with external thread and a threaded member with thread fitting with the externally threaded member, wherein the externally threaded member is movable relative to the threaded member through the engagement of the external thread and the thread, and a blocking member which is arranged outside the externally threaded member. The inside of the blocking member is provided with projections. There is space between the projections and the externally threaded member. When the externally threaded member inclines under force, friction is produced between the externally threaded member and the blocking member to perform the locking function.

11 Claims, 6 Drawing Sheets

(58) Field of Classification Search
USPC .......................... 411/230, 274, 275, 936, 247
See application file for complete search history.

(56) References Cited

U.S. PATENT DOCUMENTS

| | | | |
|---|---|---|---|
| 995,136 A | 6/1911 | Harris | |
| RE13,303 E * | 10/1911 | Moodie | ..................... 411/230 |
| 1,029,846 A * | 6/1912 | Bullard | ................... F16B 39/14 |
| | | | 411/246 |
| 1,186,072 A * | 6/1916 | Braley | .................... F16B 2/065 |
| | | | 403/344 |
| 1,276,882 A * | 8/1918 | Davis | ...................... F16B 39/14 |
| | | | 411/247 |
| 2,102,098 A * | 12/1937 | Sickles | .................. F16B 39/14 |
| | | | 411/247 |
| 3,147,003 A * | 9/1964 | Johnson | ................. B25B 5/101 |
| | | | 24/514 |
| 3,219,336 A * | 11/1965 | Merriman | ............... B25B 1/125 |
| | | | 269/187 |
| 3,744,645 A * | 7/1973 | Hochman | ............. A47F 5/0068 |
| | | | 211/186 |
| 3,949,880 A * | 4/1976 | Fortunato | ............. A47F 5/0068 |
| | | | 211/119.003 |
| 2013/0180367 A1 | 7/2013 | Wang | |

FOREIGN PATENT DOCUMENTS

| | | |
|---|---|---|
| CN | 202082256 U | 12/2011 |
| GB | 122147 | 1/1919 |

* cited by examiner

THREAD-LOCKING ASSEMBLY

FIELD OF THE INVENTION

The present invention relates to a thread assembly, or rather, a thread-locking assembly.

DESCRIPTION OF THE PRIOR ART

Thread connection is a very widely used means of connection which can be applied to different types of connection, fixed tools, such as different types of G clamps, F clamps, pliers, double ended wrenches, wrenches and other tools. The double-start thread or multi-start thread developed based on traditional single-start thread has the advantage of fast in and out with the speed twice faster at least. But the double-start thread or the multi-start thread also has its own disadvantages. For example, compared with the single-start thread, the double-start thread or the multi-start thread increases the helix angle. When the thread connection is subject to force or vibrations, the decrescent self-locking force can make the locking insecure, causing a decline in reliability of the tools using the double-start thread or the multi-start thread. How to solve the above problems simply and conveniently becomes a difficult problem in the industry.

SUMMARY OF THE INVENTION

The object of the present invention is to provide a thread-locking assembly which enhances the self-locking force of the thread assembly when being subject to force or vibration, in order to achieve the effect of locking. Especially, when the double-start thread or the multi-start thread is connected, the extra locking force is provided in order to avoid loosening of the thread connection.

In order to achieve the above purpose, the present invention provides a thread-locking assembly characterized by comprising an externally threaded member with external thread and a threaded member with thread fitting with the externally threaded member, in which the externally threaded member is movable relative to the threaded member through the engagement of the external thread and the thread, and a blocking member disposed outside the externally threaded member. The inside of the blocking member is provided with projections. When the externally threaded member inclines under force, friction is produced between the externally threaded member and the blocking member to perform the locking function.

The projections are a plurality of spaced teeth or teeth racks.

The thread is multi-start thread.

The multi-start thread is double-start thread.

The threaded member comprises a first annular member which is provided with internal thread inside fitting with the external thread of the externally threaded member, and is movable relative to the externally threaded member.

The externally threaded member comprises a threaded rod. The threaded rod is movable along the first annular member.

The blocking member is located at the side of the internal portion of the first annular member.

The blocking member comprises a second annular member which is provided with a through hole, the internal diameter of which is longer than that of the threaded rod. The projections are located inside the through hole.

The second annular member is disposed at the recess of the inside of the first annular member.

The external portion of the second annular member is circular.

The thread-locking assembly further comprises a C-shaped frame. The first annular member is disposed on one end of the C-shaped frame. The other end of the C-shaped frame is a blocking face. Through one end of the externally threaded member, the object to be clamped is fixed between the externally threaded member and the blocking face.

Alternatively, the thread-locking assembly further comprises an elongated frame and a first blocking face member with blocking face disposed on the elongated frame. The first annular member is disposed on one end of the elongated frame. A second blocking face member is disposed on one end of the threaded rod. The second blocking face member is opposite to the first blocking face member.

In another embodiment, the threaded rod is flat-shaped with absence of external thread on both sides thereof.

The thread-locking assembly also comprises a front jaw member and a rear jaw member. The front jaw member extends downward from the front end portion of the threaded rod. The front jaw portion is disposed inside the lower extension portion. The rear jaw member is movably disposed on the threaded rod through upper end portion. The inside of the lower portion is provided with a rear jaw portion. The rear jaw portion is opposite to the front jaw portion. The first annular member is disposed on one side of the upper end portion of the rear jaw member. The upper end portion of the rear jaw member is further provided with a convex clamping portion, which disposed the first annular member and the second annular member between the upper end portion of the rear jaw member and the convex clamping portion.

In another embodiment, the threaded member is internally threaded member which is provided with internal thread inside fitting with the external thread of the externally threaded member and is movable relative to the externally threaded member. The internally threaded member is only located on both sides of the externally threaded member with part of the externally threaded member exposed in the middle. The locking member is arranged outside the internally threaded member.

The locking member comprises the second annular member disposed outside of the internally threaded member. The second annular member is provided with a through hole which can accommodate the internally threaded member and the externally threaded member, and can allow the internally threaded member and the threaded rod to extend through. The projections are disposed on the inside of the through hole.

The thread-locking assembly further comprises wrench heads, a first wrench head and a second wrench head, disposed on both sides of the internally threaded member. It further comprises a first movable bar corresponding to the wrench heads and fitting with the first wrench head and a second movable bar fitting with the second wrench head. The first movable bar is located in the internal portion of the internally threaded member. One end thereof is connected with one end of the externally threaded member. The other end thereof and the first wrench head form a size-changeable cavity. The second movable bar is located in the internal portion of the internally threaded member. One end thereof is connected with the other end of the externally threaded member. The other end thereof together with the second wrench head forms a size-changeable cavity.

In another embodiment, one side of the threaded member has thread fitting with the external thread of the externally threaded member and move relative to the externally threaded member. The threaded member is only located on one side of the externally threaded member. Other external thread of other parts of the externally threaded member is exposed.

The locking member is arranged outside the threaded member, located at the opposite side of the side of the threaded member opposite to the externally threaded member.

The externally threaded member comprises a threaded rod. The threaded member is movable along the threaded rod.

The locking member comprises a teeth block which is disposed at the opposite side of the side of the externally threaded member opposite to the threaded member. The projections are disposed on the teeth block, located on the corresponding position to the exposed external thread.

The thread-locking assembly further comprises a handle. The top of the handle is provided with a lateral through hole which is used for mounting the threaded rod. Both sides of the threaded rod are mounted on both sides of the lateral through hole. The lateral portion of the externally threaded member can be exposed at the lateral through hole. The top of the lateral through hole is also provided with an upward groove. The threaded member is mounted in the groove. The lower portion of the groove communicates with the lateral through hole. The thread of the threaded member is located on the bottom of the threaded member engaging with the external thread of the externally threaded member which is located in the lateral through hole so that it is movable along the external thread. The upper end portion of the internally threaded member extends a movable jaw which is movable with the threaded member. One side of the groove extends a fixed jaw upward which is opposite to the movable jaw. The teeth block is arranged in the groove of the lower portion of the lateral through hole.

In connection with the accompany drawings, the following is to make a further explanation about the conception, structure and technical effect of the present invention to make fully understanding of the objective, characteristics and effect of the present invention.

DETAILED DESCRIPTION OF THE PREFERRED EMBODIMENTS

As shown in FIG. 1-14, a thread-locking assembly is characterized by comprising externally threaded member 1 with external thread and threaded member 2 with thread fitting with the externally threaded member, wherein externally threaded member 1 is movable relative to the threaded member through the engagement of the external thread and the thread, and blocking member 3 disposed outside the externally threaded member. The inside of the blocking member is provided with projections 31. There is space between the projections of the locking member and the externally threaded member. Under normal circumstances, the projections of the locking member do not contact with the externally threaded member, which can't affect the normal use of thread assembly. When the externally threaded member inclines under force, the externally threaded member contacts with the projections of the locking member, and provides friction with the blocking member to perform the locking function. In this way, the externally threaded member not only has original thread self-locking force but also gets the extra friction offered by the blocking member so that the locking ability of double-start thread or triple-start thread or more-start thread can be further improved. Specifically, the projections are a plurality of spaced teeth or teeth racks extending on the portion of the blocking member able to be contacted with the external thread. Wherein, the thread is multi-start thread. Preferably, the multi-start thread is double-start thread.

Figure 1:
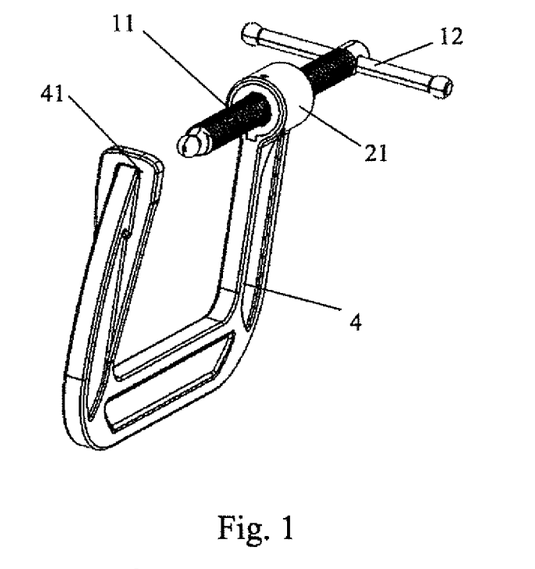
FIG. 1 is a stereogram of the first embodiment according to the present invention.
Figure 2:
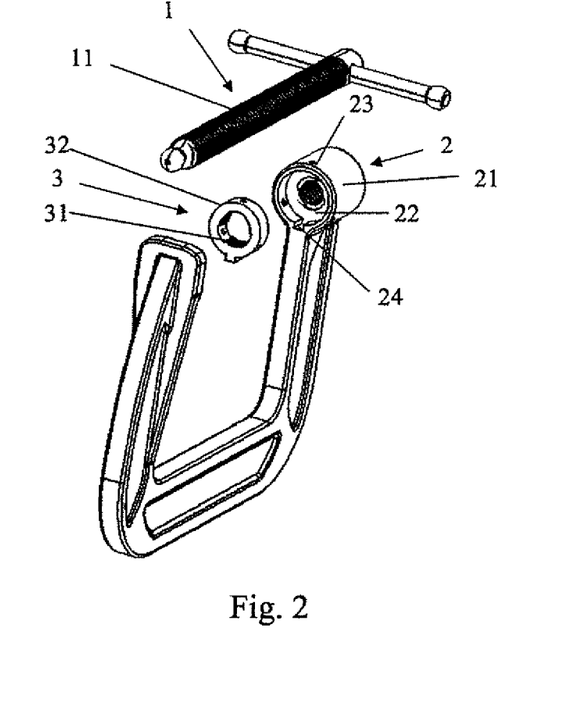
FIG. 2 is an exploded drawing of the first embodiment according to the present invention.
Figure 3:
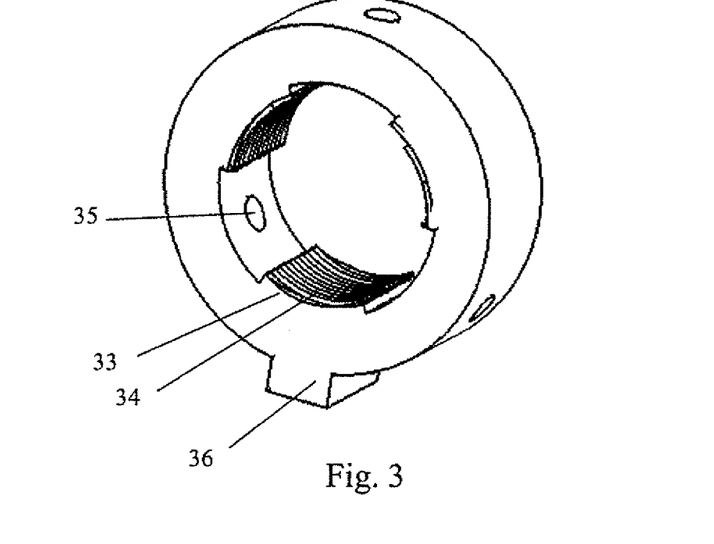
FIG. 3 is a schematic diagram of the internal annular member in the first embodiment according to the present invention.

In the first embodiment of the present invention, as shown in FIGS. 1, 2 and 3, thread-locking assembly is a G clamp. Threaded member 2 comprises first annular member 21. The external portion of the first annular member is circular which has internal thread inside fitting with the external thread of the externally threaded member and move relative to the externally threaded member. Blocking member 3 is disposed on the lateral side of the internal thread of the first annular member. In this embodiment, the blocking member is located at the side of the internal portion of the first annular member. External component 1 comprises threaded rod 11 which is movable along the first annular member.

Blocking member 3 comprises second annular member 32 disposed in the recess 22 of the first annular member 21. The second annular member has a through hole, the internal diameter of which is greater than that of the internal thread or threaded rod which can allow the threaded rod to extend through. The inside of the through hole is provided with projections 31 including teeth block 33 projecting inward. The number of the teeth block is at least one. A plurality of teeth blocks is spaced. Every teeth block has spaced teeth bar 34 on it. The second annular member also has internal through hole 35 disposed at the interval between the teeth blocks. External through hole 23 is located in the same position of the through hole of the first annular member and the second annular member which can be fixed with the first annular member through the internal through hole and the external through hole by using a connection component. The external portion of the second annular member is circular with a single projection 36 outside. The first annular member has a single fillister 24 in the relative position which is able to accommodate the projection so that the second annular member can be fixed in the first annular member.

Thread-locking assembly also comprises C-shaped frame 4. The first annular member 21 is disposed on one end of the C-shaped frame. The threaded rod 11 is movable relative to the first annular member. The other end of the C-shaped frame has blocking face 41. The object to be clamped is fixed between the threaded rod and the blocking face by the externally threaded member, that is, one end of the threaded rod. The other end of the threaded rod is equipped with handle 12. The threaded rod can be rotated by rotating the handle then move along the first annular member.

During the usage, under normal circumstances, the teeth of the second annular member and the thread of the threaded rod do not contact with each other or create great friction, which do not affect the movement of the threaded rod in the first annular member. When the threaded rod and the first annular member are fixed relatively in position, and the threaded rod inclines under force, the teeth on the second annular member offer extra friction to the threaded rod to make the threaded rod not slip along the first annular member so that the fixed state can be kept.

Figure 4:
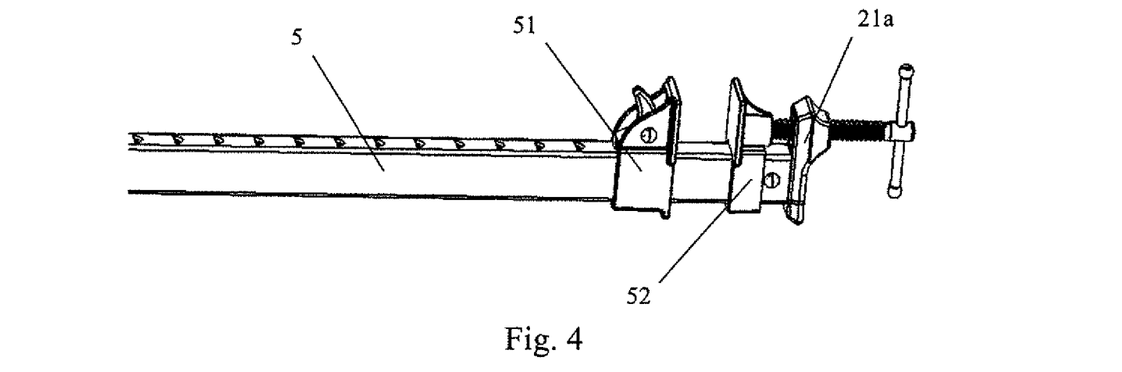
FIG. 4 is a stereogram of the second embodiment according to the present invention.
Figure 5:
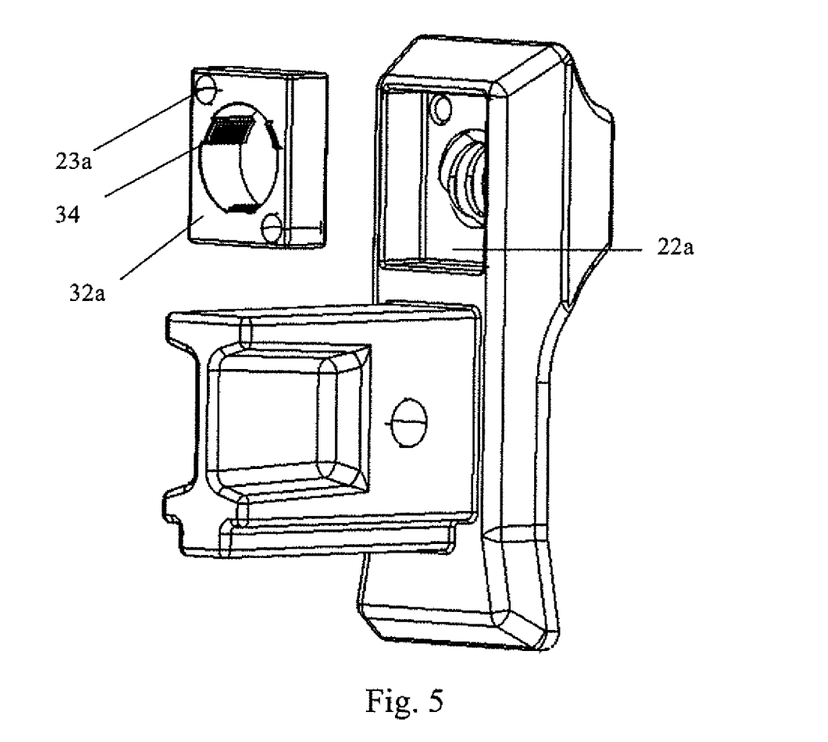
FIG. 5 is an exploded drawing of the first annular member and the second annular member in the second embodiment according to the present invention.
Figure 6:
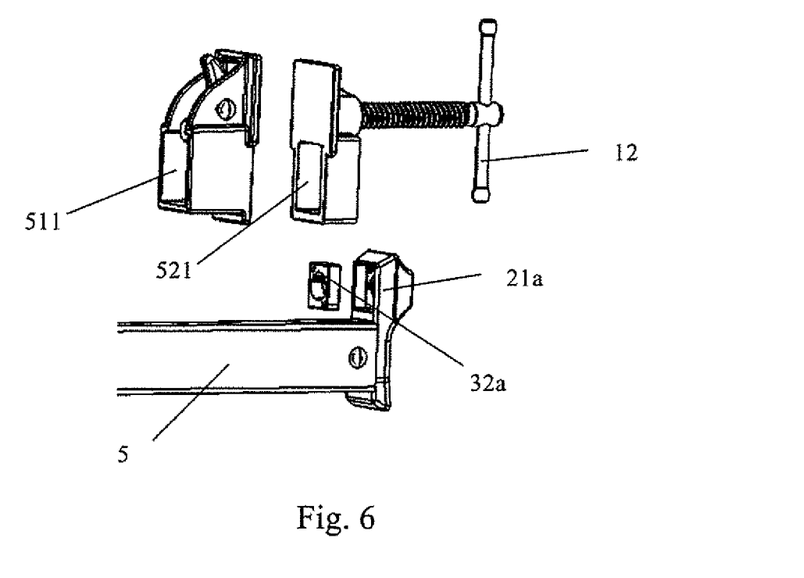
FIG. 6 is an exploded drawing of the second embodiment according to the present invention.

In the second embodiment of the present invention, as shown in FIGS. 4, 5 and 6, thread-locking assembly is an F clamp. The threaded member 2 is first annular member 21a. The external portion of the first annular member is in different shape which has internal thread inside fitting with the external thread of the externally threaded member and move relative to the externally threaded member. Blocking member 3 is disposed on the lateral side of the internal thread of the first annular member 21a. In this embodiment, the blocking member is located at the side of the internal portion of the first annular member. External component 1 comprises threaded rod 11a which is movable along the first annular member.

Blocking member 3 comprises second annular member 32a disposed in the recess 22a of the first annular member 21a. The second annular member has a through hole, the internal diameter of which is longer than that of the internal thread or threaded rod which can allow the threaded rod to extend through. The inside of the through hole is provided with projections including teeth block 33 projecting inward. The number of the teeth block is at least one. A plurality of teeth blocks is spaced. Each teeth block has spaced teeth bar 34 on it. The second annular member also has lateral through hole 23a disposed on side of the through hole which can be fixed with the first annular member through lateral through hole by using connection components so that the second annular member can be fixed in the first annular member. The external portion of the second annular member is in square shape.

Thread-locking assembly also comprises elongated frame 5 and first blocking face member 51 with blocking face disposed on the elongated frame, roughly vertical to the elongated frame. The first annular member is disposed on one end of the elongated frame. The threaded rod is movable relative to the first annular member. The object to be clamped is fixed between the threaded rod and the blocking face by the externally threaded member, that is, one end of the threaded rod. Specifically, one end of the threaded rod is provided with second blocking face member 52 opposite to the first blocking face member. The other end of the threaded rod is equipped with handle 12. The threaded rod can be rotated by rotating the handle then move along the first annular member. The first blocking face member and the second blocking face member have a single hollow extension portion 511 and 521 respectively which can be disposed on the elongated frame and move along the elongated frame.

During the usage, under normal circumstances, the teeth of the second annular member and the thread of the threaded rod do not contact with each other or create great friction, which do not affect the movement of the threaded rod in the first annular member. When the threaded rod and the first annular member are fixed relatively in position, and the threaded rod inclines under force, the teeth on the second annular member offer extra friction to the threaded rod to make the threaded rod not slip along the first annular member so that the fixed state can be kept.

Figure 7:
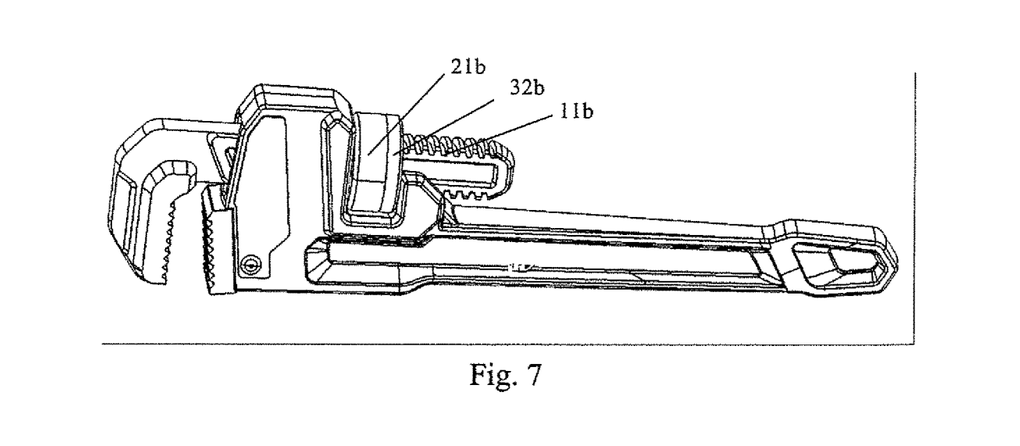
FIG. 7 is a stereogram of the third embodiment according to the present invention.
Figure 8:
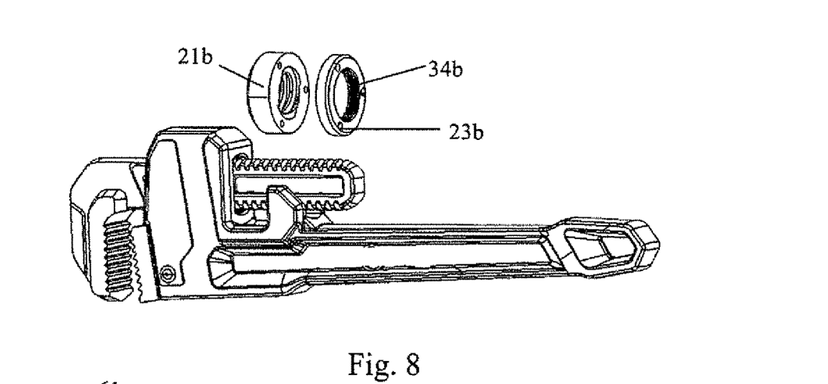
FIG. 8 is a first exploded drawing of the third embodiment according to the present invention.
Figure 9:
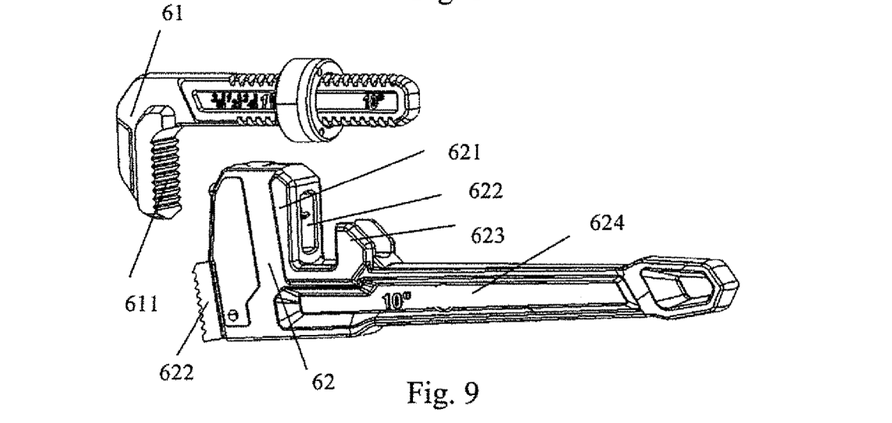
FIG. 9 is a second exploded drawing of the third embodiment according to the present invention.

In the third embodiment of the present invention, as shown in FIGS. 7, 8 and 9, the thread-locking assembly is a pipe clamp. The threaded member is the first annular member 21b. The external portion of the first annular member is circular which has internal thread inside fitting with the external thread of the externally threaded member and move relative to the externally threaded member. Blocking member 3 is disposed on the lateral side of first annular member 21b. The externally threaded member comprises threaded rod 11b shaped in flat. The thread is absent on both sides thereof, but it does not affect the first annular member moving along the threaded rod.

Blocking member 3 comprises second annular member 32b disposed on the lateral side of first annular member 21b. The second annular member has a through hole, the internal diameter of which is longer than that of the internal thread or threaded rod which can allow the threaded rod to extend through. Inside of the through hole is provided with projections, spaced teeth racks 34b projecting inward. The second annular member also has lateral through hole 23b disposed on side of the through hole which can be fixed with the first annular member through the lateral through hole by using connection components so that the second annular member can be fixed on side of the first annular member. The external portion of the second annular member is circular and in the same size with the external portion of the first annular member.

Thread-locking assembly also comprises front jaw member 61 and rear jaw member 62. The front jaw member 61 extends downward from the front end portion of the threaded rod. Front jaw portion 611 is disposed at the inside of the lower extension portion. The rear jaw member is movably disposed on the threaded rod through upper end portion 621. Inside of the lower portion has rear jaw portion 622. The rear jaw portion is opposite to the front jaw portion, which is used for clamping goods. The upper end portion of the rear jaw member has middle through hole 622 disposed on threaded rod 11b. First annular member 21b is disposed on one side of the upper end portion 621 of the rear jaw member. The upper end portion of the rear jaw member has a single convex clamping portion 623. The first annular member 21b and the second annular member are disposed between the upper end portion 621 of the rear jaw member and the convex clamping portion 623. The first annular member moves back and forth along the threaded rod by rotation to promote the rear jaw member moving back and forth. That is to adjust the distance between the front jaw portion and the rear jaw portion for clamping objects. The other side opposite to the rear jaw portion of the rear jaw member has single handle 624.

During the usage, under normal circumstances, the teeth of the second annular member and the thread of the threaded rod do not contact with each other or create great friction, which do not affect the movement of the threaded rod in the first annular member. When the threaded rod and the first annular member are fixed relatively in position, and the threaded rod inclines under force, the teeth on the second annular member offer extra friction to the threaded rod to make the threaded rod not slip along the first annular member so that the fixed state can be kept.

Figure 10:
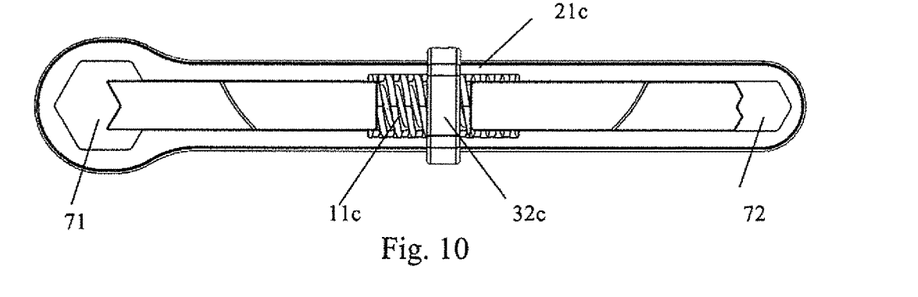
FIG. 10 is a stereogram of the fourth embodiment according to the present invention.
Figure 11:
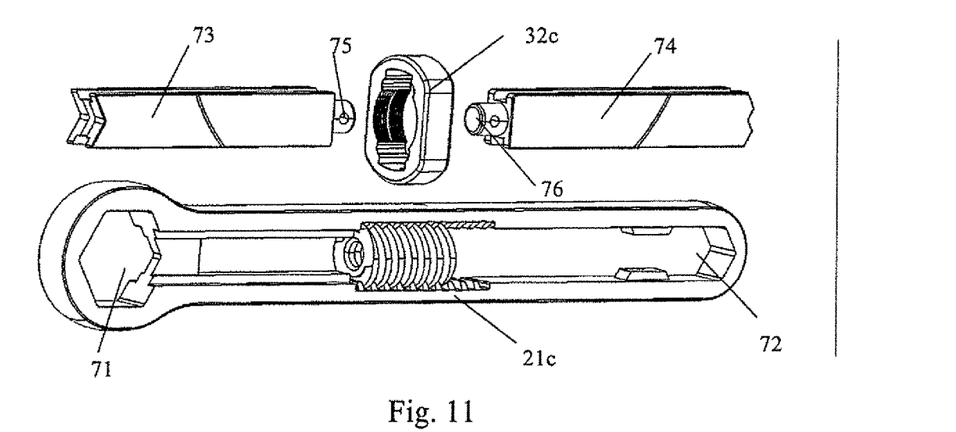
FIG. 11 is an exploded drawing of the fourth embodiment according to the present invention.
Figure 12:
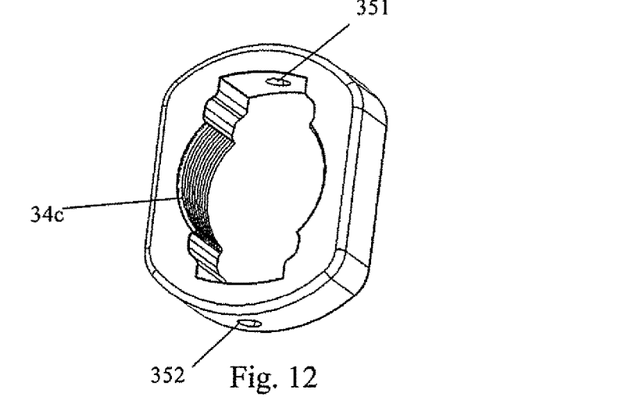
FIG. 12 is a schematic diagram of the second annular member in the fourth embodiment according to the present invention.

In the fourth embodiment of the present invention, as shown in FIGS. 10, 11 and 12, thread-locking assembly is a double-ended wrench. Threaded member is internally threaded member 21c which has internal thread inside fitting with the external thread of the externally threaded member and move relative to the externally threaded member. Specially, the internally threaded member is only located on both sides of the externally threaded member with the externally threaded member partly exposed in the middle. Blocking member 3 is disposed outside of internally threaded member 21c fixed with the threaded member. The externally threaded member comprises threaded rod 11c. The threaded rod is movable left and right along the internally threaded member.

Blocking member 3 comprises second annular member 32c disposed outside of the internally threaded member. The second annular member has a through hole which can accommodate the internally threaded member and the externally threaded member, and can allow the internally threaded member and the threaded rod to extend through. Inside of the through hole is provided with projections, specifically spaced teeth racks 34c located in the position of the internal portion of the second annular member corresponding to the exposed external thread. Upper through hole 351 and lower through hole 352 in the position of the second annular member corresponding to the threaded member are arranged respectively in upper and lower sides of the second annular member which can be fixed with the internally threaded member through the upper and lower through hole by using connection components so that the second annular member can be fixed outside the internally threaded member.

Thread-locking assembly also comprises wrench heads, first wrench head 71 and second wrench head 72, disposed respectively on both sides of the internally threaded member. The shape of the head can be the same or different. It also comprises a movable bar corresponding to the wrench head, that is, first movable bar 73 fitting with a first wrench head, a second movable bar 74 fitting with the second wrench head. The first movable bar is located in the internally threaded member. One end thereof is connected with one end of the externally threaded member. The other end thereof and the first wrench head form a size-changeable cavity which is used for suitable nut, such as large hexagonal nut. The second movable bar is located in the internally threaded member. One end thereof is connected with the other end of the externally threaded member. The other end thereof and the second wrench head form a size-changeable cavity which is used for suitable nut, such as small hexagonal nut. The threaded rod moves in the internally threaded member which can be adjusted with the usage. If it moves to the left, the cavity of the first wrench head becomes small. If it moves to the right, the cavity of the second wrench head becomes small. Specially, the externally threaded member with holes on both sides of the threaded rod can respectively accommodate convex connection portion 75 and 76 of the first movable bar and the second movable bar in order to make the connection fixed.

During the usage, under normal circumstances, the teeth of the second annular member and the thread of the threaded rod do not contact with each other or create great friction, which do not affect the movement of the threaded rod in the first annular member. When the threaded rod and the first annular member are fixed relatively in position, and the threaded rod inclines under force, the teeth on the second annular member offer extra friction to the threaded rod to make the threaded rod not slip along the first annular member so that the fixed state can be kept.

Figure 13:
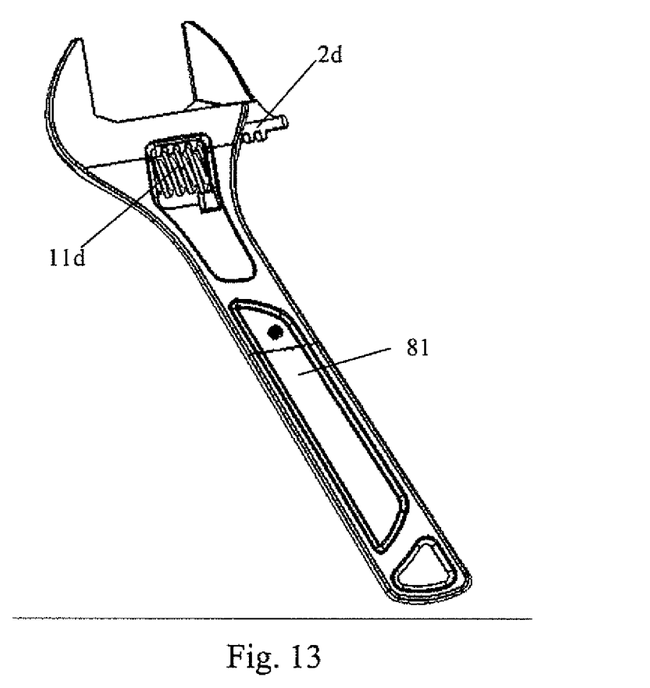
FIG. 13 is a stereogram of the fifth embodiment according to the present invention.
Figure 14:
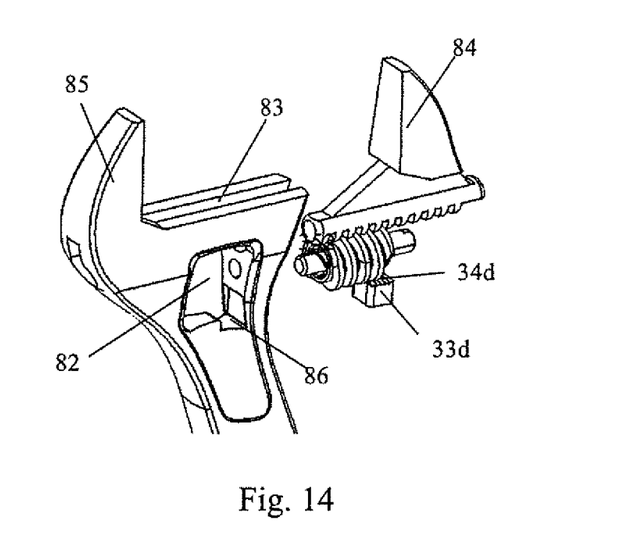
FIG. 14 is an exploded drawing of the fifth embodiment according to the present invention.

In the fifth embodiment of the present invention, as shown in FIGS. 13 and 14, thread-locking assembly is a wrench. One side of threaded member 2d has thread fitting with the external thread of the externally threaded member and move relative to the externally threaded member. Specially, the threaded member is only located on one side of the externally threaded member. The external thread of other parts of the externally threaded member is exposed. Blocking member 3 is arranged outside the threaded member, located at the side of the externally threaded member opposite to the threaded member. The externally threaded member comprises threaded rod 11d. Threaded member 2d is movable left and right along the threaded rod.

The blocking member specially comprises teeth block 33d disposed at the opposite side of the side of the externally threaded member opposite to the threaded member. The teeth block is provided with projections inside comprising spaced teeth racks 34d located in the relative position of the exposed external thread.

Thread-locking assembly also comprises handle 81. The upper end portion of the handle has lateral through hole 82 used for arranging the threaded rod. Both sides of the threaded rod are arranged on both sides of the lateral through hole. The lateral portion of the external thread exposed at the lateral through hole is used for rotating the threaded rod by hand. The top of the lateral through hole also has groove 83 upward. The threaded member is arranged in the groove. The lower portion of the groove communicates with the lateral through hole. The thread of the threaded member is located on the bottom of the threaded member engaging with the external thread of the externally threaded member which is located in the lateral through hole so that it is movable along the external thread. The upper end portion of the internally threaded member extends a movable jaw 84 which is movable left and right with the threaded member. One side of the groove extends a fixed jaw 85 upward which is opposite to the movable jaw and can clamp objects. The teeth block is arranged in the groove 86 of the lower portion of the lateral through hole.

During the usage, under normal circumstances, the teeth on the teeth block and the external thread of the threaded rod do not contact with each other or create great friction, which do not affect the relative movement between the threaded rod and the thread. When the threaded rod and the threaded member are fixed relatively in position, and the threaded rod inclines under force, the teeth on the teeth block offer extra friction to the threaded rod to make the threaded rod not slip along the teeth block so that the fixed state can be kept.

The above describes preferred embodiment of the present invention in detail. It should be understood that the common technicians in the field can make lots of modifications and changes based on the idea of the present invention without creative work. Therefore, on the basis of the prior art, all the technical schemes obtained by those skilled in the art based on the idea of the prevent invention through logical analysis, reasoning, or limited experiment should be within the scope of protection defined by the claims.

The invention claimed is:

1. A thread-locking assembly comprising:
an externally threaded member with external thread,
a threaded member with thread fitting with the externally threaded member, wherein the externally threaded member is movable relative to the threaded member through the engagement of the external thread and the thread, and
a blocking member disposed outside the externally threaded member, the inside of the blocking member is provided with projections;
the blocking member being fixed in the threaded member;
wherein during usage, when the externally threaded member and the threaded member are fixed relatively in position, the external thread does not contact with the projections; when the externally threaded member inclines in respect to an axis of the threaded member under force, the projections engage with the external thread, and produce friction to the externally threaded member so as to perform the locking function.

2. The thread-locking assembly as claimed in claim 1, wherein the projections are a plurality of spaced teeth or teeth racks.

3. The thread-locking assembly as claimed in claim 2, wherein the thread is multi-start thread.

4. The thread-locking assembly as claimed in claim 3, wherein the multi-start thread is double-start thread.

5. The thread-locking assembly as claimed in claim 4, wherein the threaded member comprises a first annular member.

6. The thread-locking assembly as claimed in claim 5, wherein the externally threaded member comprises a threaded rod which is movable along the first annular member.

7. The thread-locking assembly as claimed in claim 6, wherein the blocking member is located at the side of the internal portion of the first annular member.

8. The thread-locking assembly as claimed in claim 7, wherein the blocking member comprises a second annular member which is provided with a through hole, the internal diameter of which is greater than that of the threaded rod, and the projections are located on the inside of the through hole.

9. The thread-locking assembly as claimed in claim 8, wherein the second annular member is disposed at the recess of the inside of the first annular member.

10. The thread-locking assembly as claimed in claim 9, wherein the external portion of the second annular member is circular.

11. The thread-locking assembly as claimed in claim 10, wherein the thread-locking assembly further comprises a C-shaped frame; the first annular member is disposed on one end of the C-shaped frame; the other end of the C-shaped frame is one blocking face; through one end of the externally threaded member, the object to be clamped is fixed between the externally threaded member and the blocking face.

* * * * *

UNITED STATES PATENT AND TRADEMARK OFFICE
CERTIFICATE OF CORRECTION

| | |
|---|---|
| PATENT NO. | : 9,784,300 B2 |
| APPLICATION NO. | : 14/369847 |
| DATED | : October 10, 2017 |
| INVENTOR(S) | : Yueming Li |

Page 1 of 1

It is certified that error appears in the above-identified patent and that said Letters Patent is hereby corrected as shown below:

On the Title Page (73) Assignee:    Insert: --HANGZHOU GREAT STAR INDUSTRIAL CO., LTD, Hangzhou (CN)--

Signed and Sealed this
Seventh Day of January, 2020

Andrei Iancu
*Director of the United States Patent and Trademark Office*